United States Patent
Kijima

(10) Patent No.: US 11,584,400 B2
(45) Date of Patent: Feb. 21, 2023

(54) AUTONOMOUS VEHICLE

(71) Applicant: TOYOTA JIDOSHA KABUSHIKI KAISHA, Aichi-ken (JP)

(72) Inventor: Shinya Kijima, Nagoya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 162 days.

(21) Appl. No.: 17/168,180

(22) Filed: Feb. 5, 2021

(65) Prior Publication Data

US 2021/0284194 A1 Sep. 16, 2021

(30) Foreign Application Priority Data

Mar. 11, 2020 (JP) .............. JP2020-042358

(51) Int. Cl.
*B60W 60/00* (2020.01)
*B60W 50/038* (2012.01)

(52) U.S. Cl.
CPC ........ *B60W 60/007* (2020.02); *B60W 50/038* (2013.01); *B60W 2420/42* (2013.01)

(58) Field of Classification Search
CPC ............. B60W 60/007; B60W 50/038; B60W 2420/42
See application file for complete search history.

(56) References Cited

U.S. PATENT DOCUMENTS

2020/0039527 A1 2/2020 Hase et al.
2020/0125858 A1* 4/2020 Bauer .................. G06K 9/6289

FOREIGN PATENT DOCUMENTS

JP 2018176976 A 11/2018

* cited by examiner

*Primary Examiner* — Nicholas Kiswanto
*Assistant Examiner* — Jamal A Shah
(74) *Attorney, Agent, or Firm* — Hauptman Ham, LLP

(57) ABSTRACT

An autonomous vehicle that can perform limp home control for causing a vehicle to autonomously take refuge includes an ECU configured to perform the limp home control, limp-home usable sensors configured to detect an external environment of the autonomous vehicle, the limp-home usable sensors being used for the limp home control and being connected to the ECU, limp-home unusable sensors configured to detect the external environment of the autonomous vehicle, the limp-home unusable sensors being sensors not used for the limp home control, and a limp home battery connected to the ECU and the limp-home usable sensors but not connected to the limp-home unusable sensors.

5 Claims, 4 Drawing Sheets

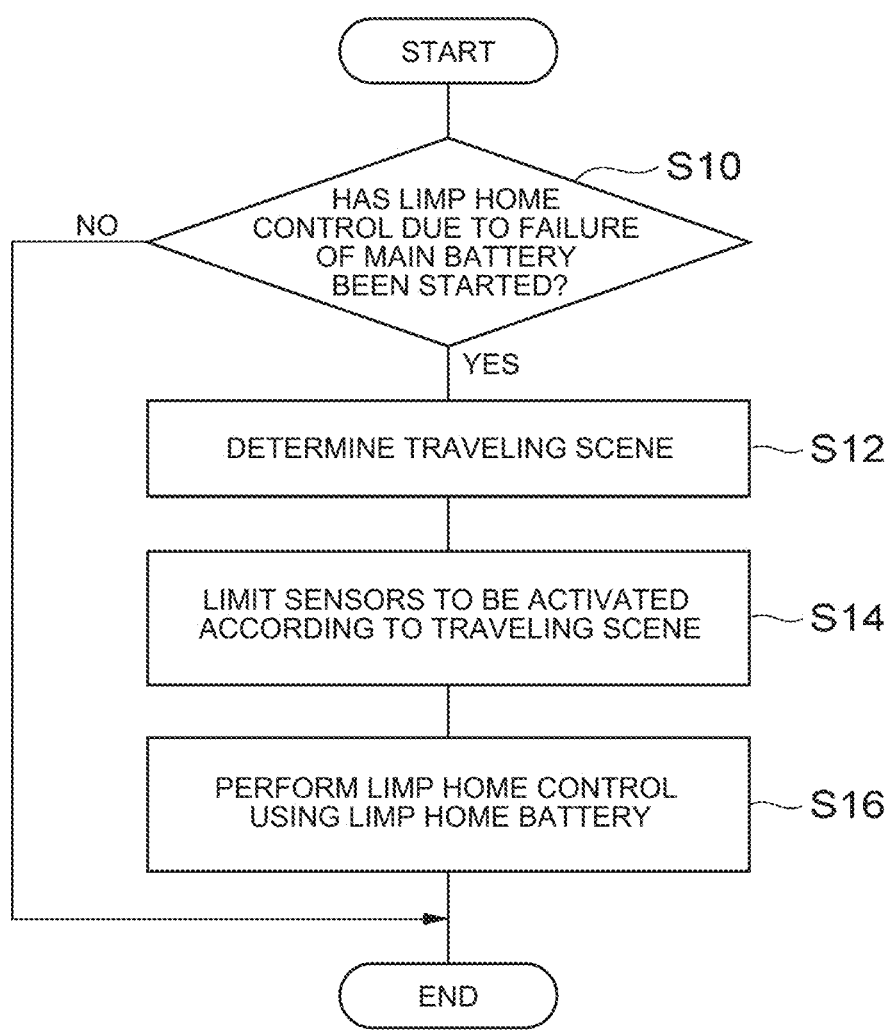

AUTONOMOUS VEHICLE

CROSS-REFERENCE TO RELATED APPLICATION

This application claims priority to Japanese Patent Application No. 2020-042358 filed on Mar. 11, 2020, incorporated herein by reference in its entirety.

BACKGROUND

1. Technical Field

The present disclosure relates to an autonomous vehicle.

2. Description of Related Art

Conventionally, as a technical document regarding the battery of an autonomous vehicle, Japanese Unexamined Patent Application Publication No. 2018-176976 (JP 2018-176976 A) is known. This publication discloses a travel control device that sets the fail operation mode corresponding to the type of an abnormal power supply when an abnormality is detected in at least one of the power storage device and the power generation device.

SUMMARY

In a conventional vehicle such as the one described above, a plurality of batteries is mounted and, when one of the batteries is abnormal, the remaining batteries supply power to the vehicle to continue autonomous driving. However, when an attempt is made to allow a spare battery to have a capacity sufficient to continue autonomous driving, the size of the spare battery increases, with the result that the spare battery takes up space in the vehicle and, in addition, the vehicle cost increases.

One aspect of the present disclosure relates to an autonomous vehicle that can perform limp home control for causing a vehicle to autonomously take refuge. The autonomous vehicle includes an ECU, limp-home usable sensors, limp-home unusable sensors, and a limp home battery. The ECU is configured to perform the limp home control. The limp-home usable sensors are configured to detect the external environment of the autonomous vehicle. The limp-home usable sensors are sensors used for the limp home control and are connected to the ECU. The limp-home unusable sensors are configured to detect the external environment of the autonomous vehicle. The limp-home unusable sensors are sensors not used for the limp home control. The limp home battery is connected to the ECU and the limp-home usable sensors but is not connected to the limp-home unusable sensors.

According to the autonomous vehicle in one aspect of the present disclosure, the limp home battery is connected to the ECU configured to perform the limp home control and to the limp-home usable sensors but is not connected to the limp-home unusable sensors. This configuration reduces the capacity, and the size, of the limp home battery.

In the autonomous vehicle in one aspect of the present disclosure, the limp-home usable sensors may include a front camera configured to detect the external environment in front of the autonomous vehicle. The limp-home unusable sensors may include a rear camera configured to detect the external environment behind the autonomous vehicle. Since the autonomous vehicle does not usually move backward in the limp home control mode, the front camera is included in the limp-home usable sensors and the rear camera is included in the limp-home unusable sensors. This configuration appropriately reduces the capacity of the limp home battery.

In the autonomous vehicle in one aspect of the present disclosure, the limp-home usable sensors may include a front radar configured to detect the external environment in front of the autonomous vehicle. The limp-home unusable sensors may include a rear radar configured to detect the external environment behind the autonomous vehicle. Since the autonomous vehicle does not usually move backward in the limp home control mode, the front radar is included in the limp-home usable sensors and the rear radar is included in the limp-home unusable sensors. This configuration appropriately reduces the capacity of the limp home battery.

In the autonomous vehicle in one aspect of the present disclosure, the limp-home unusable sensors may include sonar sensors. Since the autonomous vehicle does not use the sonar sensors in the limp home control mode, the sonar sensors are included in the limp-home unusable sensors. This configuration appropriately reduces the capacity of the limp home battery.

In the autonomous vehicle in one aspect of the present disclosure, the limp home battery may be connected to a vehicle external notification unit configured to notify the outside of the autonomous vehicle of the state of the autonomous vehicle. As a result, other vehicles are less likely to casually approach the autonomous vehicle than when the state of the autonomous vehicle in the limp home control mode is not notified to the surroundings at all.

According to one aspect of the present disclosure, the autonomous vehicle uses the configuration in which the limp home battery is not connected to the limp-home unusable sensors, making it possible to make the limp home battery compact and to reduce its mounting space.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a flowchart showing an example of the processing of limp-home control due to a failure of a main battery.

DETAILED DESCRIPTION OF EMBODIMENTS

An embodiment of the present disclosure will be described below with reference to the drawings.

Figure 1:
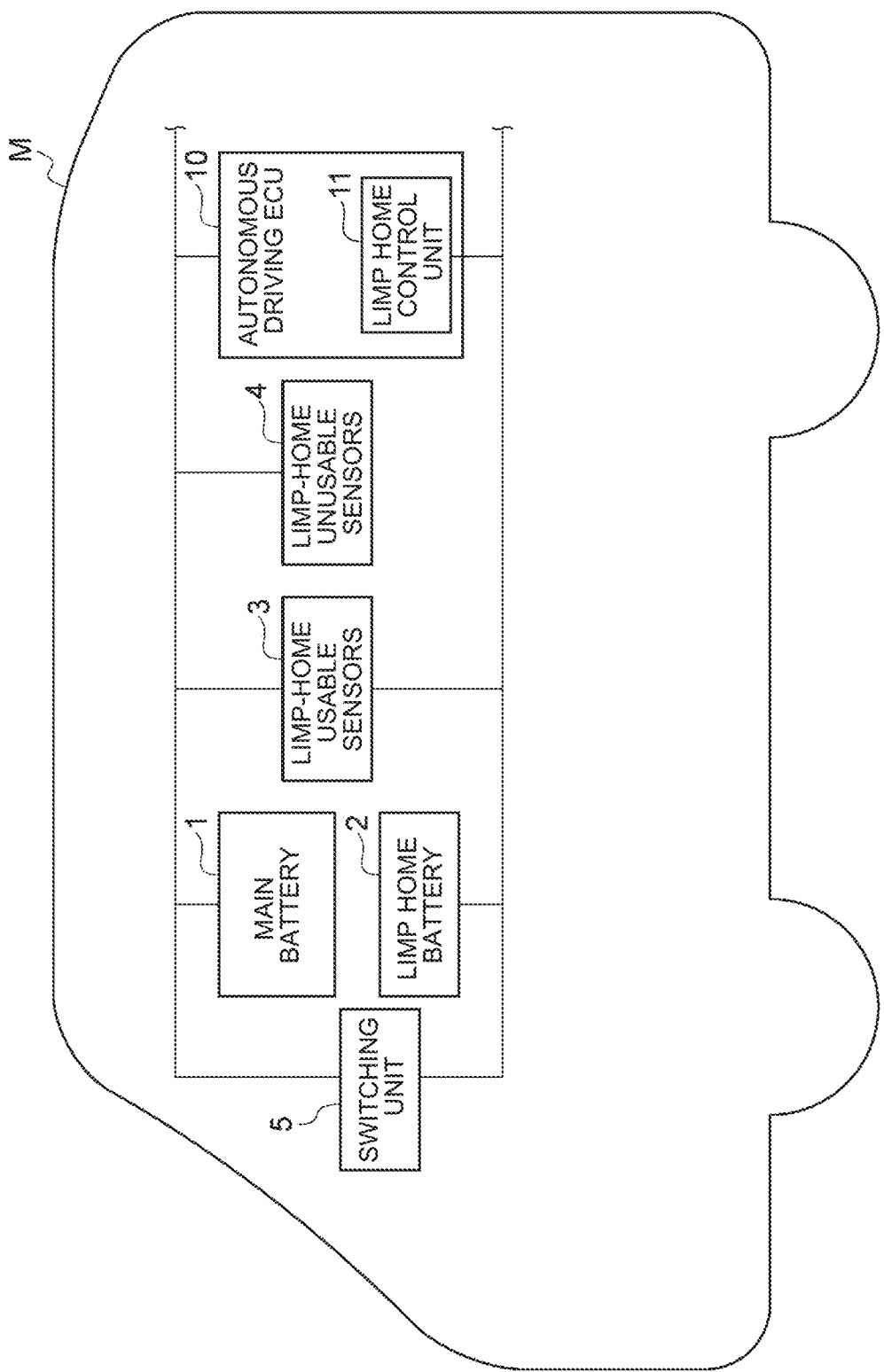
FIG. 1 is a block diagram showing a part of the battery connection structure of an autonomous vehicle according to one embodiment.

An autonomous vehicle M shown in FIG. 1 is a vehicle capable of autonomous driving. The autonomous vehicle M may be a gasoline vehicle, a hybrid vehicle, or an electric vehicle. Autonomous driving means that a vehicle autonomously travels toward the destination without any driving operation by a driver. The destination may be set by an occupant such as a driver, or may be set automatically by the vehicle.

When a situation occurs in which autonomous driving cannot be continued and, in addition, manual driving is not performed by the driver, the autonomous vehicle M performs limp home control to cause the autonomous vehicle M to take refuge, for example, on the road shoulder. Situations in which autonomous driving cannot be continued include a failure of the main battery or a sensor abnormality. The emergency refuge area used by the limp home control is not particularly limited. That is, the emergency refuge area may be a road shoulder where there is no obstacle or may be an emergency parking zone provided on the side of the road (a space provided on the side of the road for the purpose of stopping a disabled vehicle or an emergency vehicle). The details of the limp home control will be described later in detail.

Figure 2:
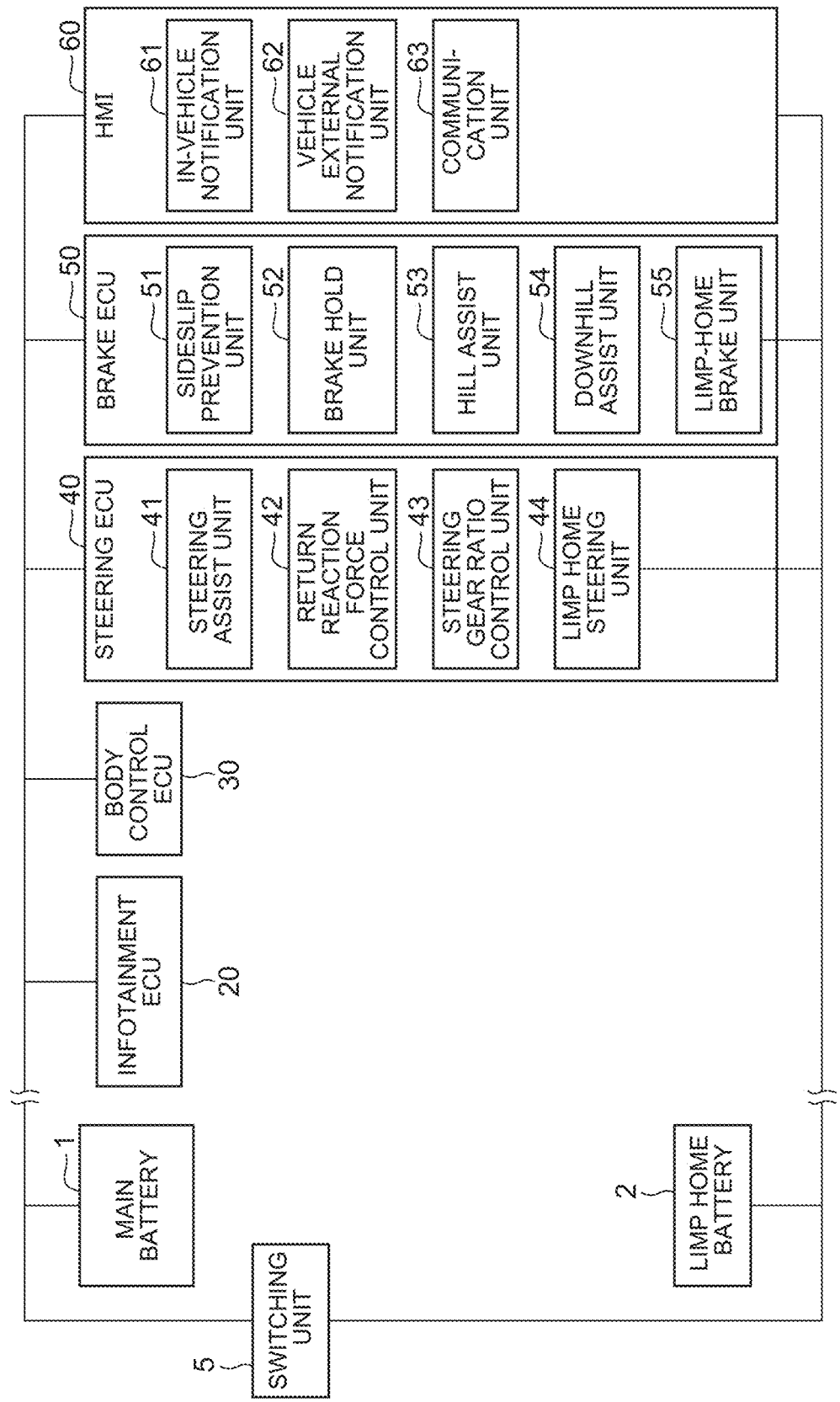
FIG. 2 is a block diagram showing the rest of the battery connection structure.

As shown in FIG. 1 and FIG. 2, the autonomous vehicle M includes a main battery 1, a limp home battery 2, limp-home usable sensors 3, limp-home unusable sensors 4, a switching unit 5, an autonomous driving ECU 10, an infotainment ECU 20, a body control ECU 30, a steering ECU 40, a brake ECU 50, and an HMI 60.

The main battery 1 is an electric storage device that supplies power to each device of the autonomous vehicle M. The main battery 1 has sufficient performance and size since it supplies power to many sensors and electronic units of the autonomous vehicle M. The main battery 1 may be connected to a generator not shown. The generator is not particularly limited; for example, a motor generator that generates electricity by the engine rotation of an autonomous vehicle M is used. The main battery 1 may also be powered directly from an external power supply facility.

The main battery 1 is connected to the limp-home usable sensors 3, limp-home unusable sensors 4, switching unit 5, autonomous driving ECU 10, infotainment ECU 20, body control ECU 30, steering ECU 40, brake ECU 50, and HMI 60 to supply power to them. In addition, the main battery 1 is connected to various components that use power, such as a power trail ECU and an actuator not shown.

The limp home battery 2 is an electric storage device used for the limp home control of the autonomous vehicle M when the main battery 1 fails. Basically, the limp home battery 2 is not used while the main battery 1 is working. The limp home battery 2 may also be connected to a generator not shown. The limp home battery 2 may also be powered directly from an external power supply facility.

The limp home battery 2 only need to be connected so that power can be supplied at least to the traveling function (function for traveling, turning, and stopping) necessary for performing the limp home control of the autonomous vehicle M. The limp home battery 2 may be connected so that power can be supplied to the information notification function provided for notifying the driver and the surrounding vehicles about the situation in which the autonomous vehicle M is traveling in a limp home mode.

In the example shown, the limp home battery 2 is connected so that power can be supplied to the limp-home usable sensors 3, switching unit 5, autonomous driving ECU 10, steering ECU 40, brake ECU 50, and HMI 60. The limp home battery 2 is not connected to the limp-home unusable sensors 4, infotainment ECU 20, and body control ECU 30. To the limp home battery 2, the power trail ECU (not shown) and various actuators used for the limp home control may be connected. The various actuators may each have a minimum actuator configuration for performing the limp home control.

When the autonomous driving ECU 10 is configured by a plurality of electronic units, the limp home battery 2 may be connected only to an electronic unit that has the limp home control function (for example, the limp home control unit 11). An electronic unit means a unit structure that functions as a power-supply receiving unit to which power can be supplied separately and individually. The limp home battery 2 can be configured not to be connected an electronic unit that is one of the electronic units of the autonomous driving ECU 10 and is provided for performing the learning function.

Similarly, when the steering ECU 40 is configured by a plurality of electronic units, the limp home battery 2 may be connected only to an electronic unit that is one of the electronic units of the steering ECU 40 and is provided for controlling the minimum steering force required for the limp home control (for example, the limp-home steering unit 44).

Similarly, when the brake ECU 50 is configured by a plurality of electronic units, the limp home battery 2 may be connected only to an electronic unit that is one of the electronic units of the brake ECU 50 and is provided for controlling the minimum braking force required for the limp home control (for example, the limp-home brake unit 55).

Note that, instead of the connection described above, the limp home battery 2 may be connected so that power can be supplied to the whole autonomous driving ECU 10. Similarly, the limp home battery 2 may be connected so that power can be supplied to the whole steering ECU 40 or may be connected so that power can be supplied to the whole brake ECU 50.

The limp-home usable sensors 3, which are sensors (external sensors) for detecting the external environment (road situation, obstacle situation, etc.) of the autonomous vehicle M, are used for the limp home control of the autonomous vehicle M. The external sensors include at least one of cameras, radars, and lidars (light detection and ranging). The external sensors may include sonar sensors.

A camera is a capturing device that captures the external environment of the autonomous vehicle M. A radar is a detection device that uses millimeter waves for detecting an object around the autonomous vehicle M. More specifically a radar detects an object by sending radio waves (for example, millimeter waves) around the autonomous vehicle M and by receiving the radio waves reflected by the object. A lidar is a detection device that uses light, instead of millimeter waves, for detecting an object around the autonomous vehicle M. A sonar sensor is a detection device that uses sound waves for detecting an object around the autonomous vehicle M.

The limp-home unusable sensors 4, which are sensors for detecting the external environment of the autonomous vehicle M, are not used for the limp home control of the autonomous vehicle M. The limp-home unusable sensors 4 include sensors that are external sensors for detecting the external environment of the autonomous vehicle M but are not limp-home usable sensors 3. The limp-home unusable sensors 4 include, for example, at least one of cameras, radars, sonar sensors, and the like that are directed to the direction not used for the limp home control (for example, rearward).

Figure 3:
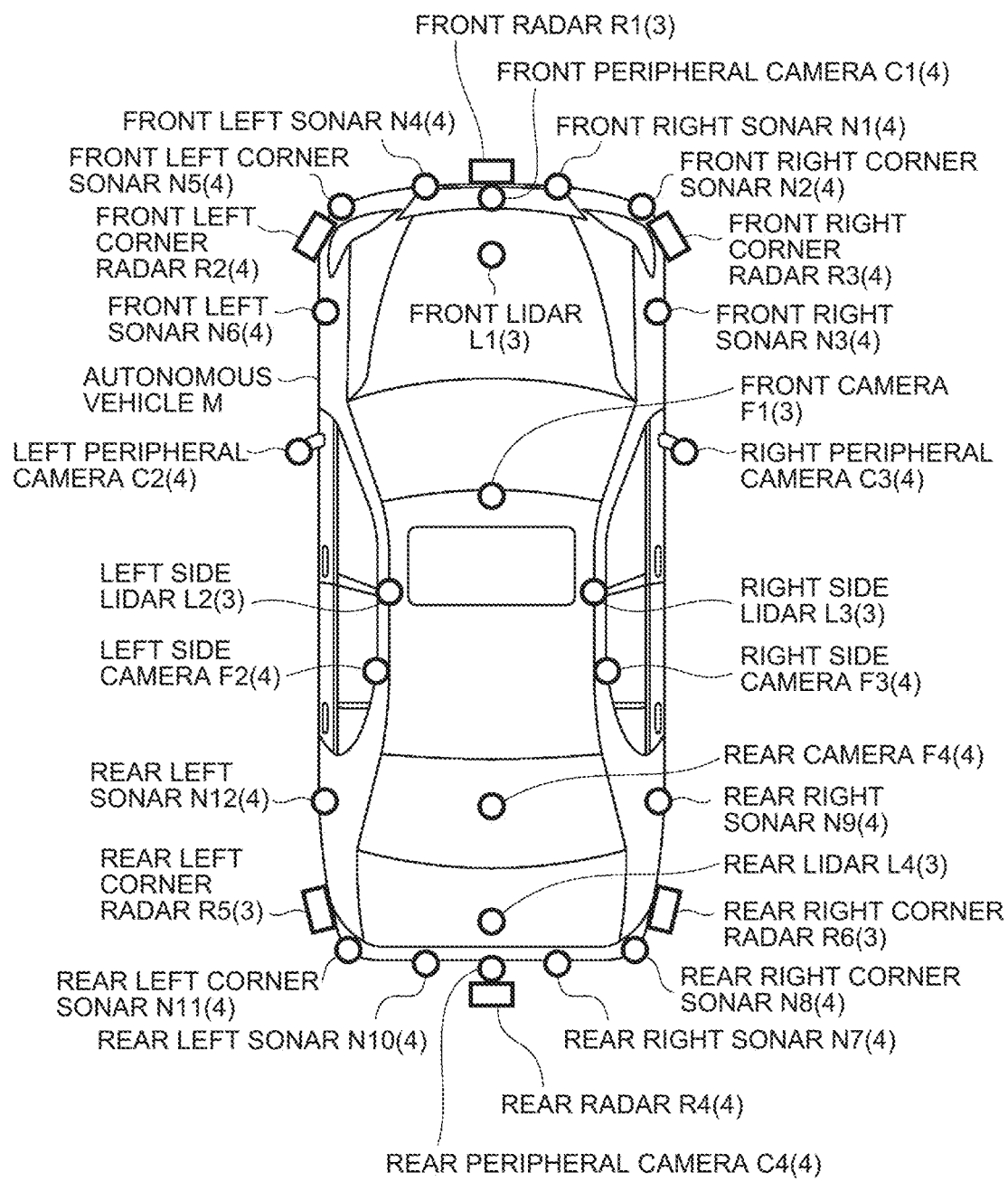
FIG. 3 is a plan view showing an example of sensors of an autonomous vehicle.

FIG. 3 is a plan view showing an example of sensors of the autonomous vehicle M. As the radars of the autonomous vehicle M, FIG. 3 shows a front radar R1, a front left corner radar R2, a front right corner radar R3, a rear radar R4, a rear left corner radar R5, and a rear right corner radar R6.

Furthermore, as the cameras of the autonomous vehicle M, FIG. 3 shows a front camera F1, a left side camera F2, a right side camera F3, a rear camera F4, a front peripheral camera C1, a left peripheral camera C2, a right peripheral camera C3, and a rear peripheral camera C4. The front peripheral camera C1, left peripheral camera C2, right peripheral camera C3, and rear peripheral camera C4 are cameras for capturing a close distance object (for example, within 20 m) and are mounted in such a way that a part of the vehicle is included in the capturing range. The front camera F1, left side camera F2, right side camera F3, and rear camera F4 are cameras for capturing an object that is more distant than those captured by the peripheral cameras C1 to C4. For example, the front camera F1, which can capture a distant object, is used for the limp home control.

Similarly, as the lidars of the autonomous vehicle M, FIG. 3 shows a front lidar L1, a left side lidar L2, a right side lidar L3, and a rear lidar L4. In addition, as the sonar sensors of the autonomous vehicle M, FIG. 3 shows a front right sonar N1, a front right corner sonar N2, a front right sonar N3, a front left sonar N4, a front left corner sonar N5, a front left sonar N6, a rear right sonar N7, a rear right corner sonar N8, a rear right sonar N9, a rear left sonar N10, a rear left corner sonar N11, and a rear left sonar N12.

In the autonomous vehicle M shown in FIG. 3, the limp-home usable sensors 3 include the front radar R1, rear left corner radar R5, and rear right corner radar R6. The rear left corner radar R5 and the rear right corner radar R6 are used to detect other vehicles approaching from behind the autonomous vehicle M that is moving to the road shoulder. When a vehicle-external notification unit 62, which will be described later, can be used to notify other vehicles approaching from behind about an abnormal situation of the autonomous vehicle M, the limp-home usable sensors 3 need not necessarily include the rear left corner radar R5 and the rear right corner radar R6.

The limp-home usable sensors 3 also include the front camera F1, front lidar L1, left side lidar L2, right side lidar L3, and rear lidar L4. The rear lidar L4 need not necessarily be included in the limp-home usable sensors 3.

On the other hand, in the autonomous vehicle M shown in FIG. 3, the limp-home unusable sensors 4 include the front left corner radar R2, front right corner radar R3, and rear radar R4. In addition, the limp-home unusable sensors 4 include the left side camera F2, right side camera F3, and rear camera F4, all peripheral cameras C1 to C4, and all sonar sensors N1 to N12.

Note that FIG. 3 shows an example. This means that the limp-home usable sensors 3 may include any of the front left corner radar R2, front right corner radar R3, and rear radar R4, may include any of the left side camera F2. right side camera F3, and rear camera F4, may include any of the peripheral cameras C1 to C4, and may include any of the sonar sensors N1 to N12.

The switching unit 5 performs battery switching, in which the power supply is switched from the main battery 1 to the limp home battery 2, when the main battery 1 fails. The structure of the switching unit 5 is not particularly limited as long as the battery switching can be performed. The switching unit 5 may be configured by a relay, may be configured by a switching element, or may be configured by a microcomputer. To diagnose a failure of the main battery 1, a known method may be used.

The autonomous driving ECU 10 is an electronic control unit having a central processing unit (CPU), a read only memory (ROM), a random access memory (RAM), etc. The autonomous driving ECU 10 loads a program from the ROM into the RAM and causes the CPU to execute the program, loaded into the RAM, for implementing various functions related to autonomous driving. The autonomous driving ECU 10 may be configured by a plurality of electronic units.

The autonomous driving ECU 10 performs autonomous driving of the autonomous vehicle M. The autonomous driving ECU 10 generate a travel plan based on a predetermined target route, map information, the position of the autonomous vehicle M on the map, the traveling state of the autonomous vehicle M (vehicle speed, acceleration, yaw rate, etc.), and the external environment of the autonomous vehicle M (relative to obstacles). According to the generated driving plan, the autonomous driving ECU 10 sends the control signal to the power trail ECU (not shown), steering ECU 40, brake ECU 50, etc. to perform the autonomous driving of the autonomous vehicle M.

The autonomous driving ECU 10 has a limp home control unit 11 for performing the limp home control. The limp home control unit 11 will be described in detail later.

The infotainment ECU 20 is an ECU that controls audio equipment and the like in the vehicle. The body control ECU 30 is an ECU that controls the air conditioner, meters, etc. in the vehicle. The infotainment ECU 20 and the body control ECU 30, which are not used for the limp home control, are not connected to the limp home battery 2.

The steering ECU 40 is an ECU that controls the steering of the autonomous vehicle M. The steering ECU 40 controls the electric power steering system (EPS) and, via the steering actuator (torque motor, etc.), applies steering force to the autonomous vehicle M. The steering ECU 40 includes, for example, a steering assist unit 41, a return reaction force control unit 42, a steering gear ratio control unit 43, and a limp home steering unit 44.

The steering assist unit 41 assists the driver in steering. The steering assist unit 41 controls the torque of the steering wheel and, using a known method, assists the driver in steering. The return reaction force control unit 42 controls the return reaction force of the steering wheel. The return reaction force control unit 42 adjusts the return reaction force so that the reaction force is appropriate for the driver. The steering gear ratio control unit 43 adjusts the steering gear ratio through electronic control. Note that the steering ECU 40 does not necessarily include the steering assist unit 41, the return reaction force control unit 42, and the steering gear ratio control unit 43.

The limp home steering unit 44 gives a steering force, required for performing the limp home control, to the autonomous vehicle M in response to the control signal received from the limp home control unit 11 of the autonomous driving ECU 10. The upper limit of the steering force given by the limp home steering unit 44 may be lower than the upper limit of the steering force given by the steering ECU 40 during normal autonomous driving. The upper limit of the steering force given by the limp home steering unit 44 may be limited, for example, to the minimum steering force required for the limp home control.

When the steering ECU 40 is configured by a plurality of electronic units, the limp home battery 2 only need to be connected to an electronic unit that is one of the electronic units of the steering ECU 40 and that includes the limp home steering unit 44. The limp home battery 2 does not need to be connected to the electronic units corresponding to the steering assist unit 41, the return reaction force control unit 42, and the steering gear ratio control unit 43.

The brake ECU 50 is an ECU that controls the braking of the autonomous vehicle M. The brake ECU 50 controls the brake system (for example, hydraulic braking system) of the autonomous vehicle M via the brake actuator or the like to apply braking force to the wheels of the autonomous vehicle M.

The brake ECU 50 includes, for example, a sideslip prevention unit 51, a brake hold unit 52, a hill assist unit 53, a downhill assist unit 54, and the limp home brake unit 55.

The sideslip prevention unit 51 controls the stability of the autonomous vehicle M. The sideslip prevention unit 51 may be a part of the vehicle stability control system (VSC). The brake hold unit 52 performs the brake hold function that holds a braking force while the autonomous vehicle M is stopped, such as when waiting for a traffic light. The hill assist unit 53 performs the hill assist function that maintains the stopped state without pressing the brake pedal on an uphill slope. The downhill assist unit 54 performs the downhill assist function that automatically controls the brakes on a downhill slope. Note that the brake ECU 50 does not necessarily include the sideslip prevention unit 51, brake hold unit 52, hill assist unit 53, and downhill assist unit 54.

The limp-home brake unit 55 applies a braking force, required for performing the limp home control, to the autonomous vehicle M in response to the control signal received from the limp home control unit 11 of the autonomous driving ECU 10. The upper limit of the braking force applied by the limp-home brake unit 55 may be lower than the upper limit of the braking force applied by the brake ECU 50 during normal autonomous driving. The upper limit of the braking force that the limp-home brake unit 55 can apply may be limited, for example, to the minimum braking force for required the limp home control.

When the brake ECU 50 is configured by a plurality of electronic units, the limp home battery 2 only need to be connected to an electronic unit that is one of the electronic units of the brake ECU 50 and that includes the limp-home brake unit 55. The limp home battery 2 does not need to be connected to the electronic units corresponding to the sideslip prevention unit 51, brake hold unit 52, hill assist unit 53, and downhill assist unit 54.

The human machine interface (HMI) 60 functions as an interface between the autonomous vehicle M and the driver or as an interface between the vehicle M and the surrounding vehicles. The HMI 60 also has the function of carrying out road-to-vehicle communication with a traffic information network. More specifically, the HMI 60 has an in-vehicle notification unit 61, a vehicle-external notification unit 62, and a communication unit 63.

The in-vehicle notification unit 61 uses a display and a speaker, provided for use in the vehicle cabin, to notify the driver. When an in-vehicle signage for use in the vehicle cabin is provided in the autonomous vehicle M, the in-vehicle notification unit 61 may use the in-vehicle signage to notify the driver. For example, when a failure of the main battery 1 is diagnosed during autonomous driving, the in-vehicle notification unit 61 uses at least one of images and voices to notify the driver that autonomous driving cannot be continued due to the failure of the main battery 1. At the time when the limp home control of the autonomous vehicle M is started, the in-vehicle notification unit 61 notifies the driver that the limp home control is started.

The vehicle-external notification unit 62 notifies the outside of the vehicle that the autonomous vehicle M is now performing limp home control. For example, the vehicle-external notification unit 62 turns on the hazard lamp to notify the outside of the vehicle that the autonomous vehicle M is now performing limp home control. The vehicle-external notification unit 62 may use the hazard lamp in combination with the brake lamp.

When the autonomous vehicle M has a vehicle-external signage or a vehicle-external speaker, the vehicle-external notification unit 62 may use the vehicle-external signage or the vehicle-external speaker to notify the surroundings of the state of the autonomous vehicle M. For example, the vehicle-external notification unit 62 displays an image, such as text, on the vehicle-external signage to notify the surroundings of the state of the autonomous vehicle M. The vehicle-external notification unit 62 may also display an image on the vehicle-external signage to notify the surroundings of the limp home traveling direction of the autonomous vehicle M. Similarly, the vehicle-external notification unit 62 may use the vehicle-external speaker to output a voice to notify the surroundings of the state of the autonomous vehicle M and the limp home traveling direction. When the vehicle-external signage or the vehicle-external speaker is used in this way, the limp home battery 2 supplies power also to the vehicle-external signage or the vehicle-external speaker.

The communication unit 63 carries out vehicle-to-vehicle communication and road-to-vehicle communication. The communication unit 63 may send the information on the state of the autonomous vehicle M and the limp home traveling direction to the other vehicles around the autonomous vehicle M via vehicle-to-vehicle communication. The communication unit 63 may acquire the obstacle information or the emergency refuge area information from other vehicles via vehicle-to-vehicle communication. The communication unit 63 may acquire the traffic information on the surroundings of the autonomous vehicle M via road-to-vehicle communication.

Next, the function of the limp home control unit 11 of the autonomous driving ECU 10 will be described. The limp home control unit 11 performs the limp home control of the autonomous vehicle M when the main battery 1 of the autonomous vehicle M fails. The limp home control unit 11 checks the external environment, detected by the limp-home usable sensors 3, to identify an emergency refuge area (vacant road shoulder space, emergency parking zone, etc.) around the autonomous vehicle M to which the autonomous vehicle M can move. The limp home control unit 11 may identify an emergency refuge area by referring to the map information. Based on the external environment detected by limp-home usable sensors 3 and on the driving state (vehicle speed, etc.) of the autonomous vehicle M, the limp home control unit 11 generates a limp-home traveling plan for reaching the emergency refuge area, which is the destination, while avoiding contact with obstacles. Then, based on the limp-home traveling plan that has been generated, the limp home control unit 11 sends the control signal to the power trail ECU (not shown), the steering ECU 40, and the brake ECU 50 to perform the limp home control.

When the limp home control is started, the limp home control unit 11 may determine the traveling scene of the autonomous vehicle M and limit the sensors to be activated according to the determined traveling scene. For example, the limp home control unit 11 determines the traveling scene based on the external environment detected by the external sensors, the position of the autonomous vehicle M on the map, and the map information.

For example, using the table data that associates traveling scenes with sensors to be activated in advance, the limp home control unit 11 limits (identifies) the sensors to be activated to some of the limp-home usable sensors 3. The traveling scenes include, for example, the scene of traveling on a road with multiple lanes on one side, the scene of turning right at an intersection, the scene of entering a railroad crossing, the scene of traveling on a rampway, and so on.

When it is determined that the autonomous vehicle M is in the scene in which the autonomous vehicle M is traveling in a lane of a road with multiple lanes on one side, the limp home control unit 11 limits the sensors to be activated to the front radar R1, the front camera F1, the lidars L1 to L4, and the rear left corner radar R5 or the rear right corner radar R6 whichever corresponds to the direction of the emergency refuge area (road shoulder, etc.). At this time, to obtain the information on the other surrounding vehicles, the limp home control unit 11 may carry out vehicle-to-vehicle communication through the communication unit 63 of the HMI 60.

When it is determined that the autonomous vehicle M is in the scene in which the autonomous vehicle M is turning right at an intersection, the limp home control unit 11 limits the sensors to be activated to the front radar R1, the front camera F1, and the lidars L1 to L4. At this time, to obtain the traffic information around the intersection, the limp home control unit 11 may carry out road-to-vehicle communication through the communication unit 63 of the HMI 60.

When it is determined that the autonomous vehicle M is in the scene in which the autonomous vehicle M is entering a railroad crossing or in the scene in which the autonomous vehicle M is traveling on a rampway, the limp home control unit 11 limits the sensors to be activated to the front radar R1, the front camera F1, and lidars L1 to L4.

In this way, the limp home control unit 11 limits the sensors to be activated to some of the limp-home usable sensors 3 according to the traveling scene. This reduces the capacity required for the limp home battery 2, thus reducing the size, and the installation space, of the limp home battery 2.

Next, an example of the processing of the limp home control performed due to a failure of the main battery in the autonomous vehicle M will be described below with reference to the drawings. FIG. 4 is a flowchart showing an example of the processing of the limp home control due to a failure of the main battery.

As shown in FIG. 4, the limp home control unit 11 of the autonomous driving ECU 10 determines, in S10, whether the limp home control due to a failure of the main battery 1 has been started. The limp home control unit 11 itself may determine to start the limp home control or other units, such as the vehicle diagnostic unit, may determine to start the limp home control. A known method may be used to determine whether the limp home control has been started. When it is determined that limp home control due to a failure of the main battery 1 has been started (S10: YES), the processing of the limp home control unit 11 proceeds to S12. When it is not determined that the limp home control due to a failure of the main battery 1 has been started (S10: NO), the limp home control unit 11 terminates the current processing. After that, after a certain period of time has elapsed, the limp home control unit 11 determines in S10 again whether the limp home control due to a failure of the main battery 1 has been started.

In S12, the limp home control unit 11 determines the traveling scene of the autonomous vehicle M. The limp home control unit 11 determines the traveling scene, for example, based on the external environment detected by the external sensors, the position of the autonomous vehicle M on the map, and the map information.

In S14, the limp home control unit 11 limits the sensors to be activated according to the traveling scene. For example, using the table data that associates traveling scenes with the sensors to be activated in advance, the limp home control unit 11 limits the sensors to be activated to some of the limp-home usable sensors 3. For example, when the autonomous vehicle M is in the scene in which the autonomous vehicle M is traveling in a lane of a road with multiple lanes on one side, the limp home control unit 11 limits the sensors to be activated to the front radar R1, the front camera F1, the lidars L1 to L4, and the rear left corner radar R5 or the rear right corner radar R6 whichever corresponds to the direction of the emergency refuge area (road shoulder, etc.).

In S16, the limp home control unit 11 performs the limp home control. More specifically, using the activated sensors that are some limited sensors selected from the limp-home usable sensors 3, the limp home control unit 11 sends the control signal to the units, such as the steering ECU 40, to perform the limp home control of the autonomous vehicle M.

According to the autonomous vehicle M in this embodiment described above, the limp home battery 2 is connected to the autonomous driving ECU 10 configured to perform the limp home control and to the limp-home usable sensors 3 but is not connected to the limp-home unusable sensors 4. This configuration reduces the capacity, and the size, of the limp home battery 2.

In addition, since the autonomous vehicle M does not usually move backward in the limp home control mode, the front camera F1 is included in the limp-home usable sensors 3 and the rear camera F4 is included in the limp-home unusable sensors 4. This configuration appropriately reduces the capacity of the limp home battery 2. Similarly, since the autonomous vehicle M does not usually move backward in the limp home control mode, the front radar R1 is included in the limp-home usable sensors 3 and the rear radar R4 is included in the limp-home unusable sensors 4. This configuration appropriately reduces the capacity of the limp home battery 2.

In addition, since the autonomous vehicle M does not use the sonar sensors N1 to N12 in the limp home control mode, the sonar sensors N1 to N12 are included in the limp-home unusable sensors 4. This configuration appropriately reduces the capacity of the limp home battery 2. Furthermore, in autonomous vehicle M, the limp home battery 2 is connected to the vehicle-external notification unit 62. Therefore, other vehicles are less likely to casually approach the autonomous vehicle M than when the state of the autonomous vehicle M in the limp home control mode is not notified to the surroundings at all. If it is possible to reduce the possibility that other vehicles casually approach the autonomous vehicle M, both the rear left corner radar R5 and the rear right corner radar R6 may be included in the limp-home unusable sensors 4.

While the embodiments of the present disclosure have been described above, it is to be understood that the present disclosure is not limited to the specific embodiments described above. The present disclosure can be implemented not only by the embodiments described above but also in a variety of modes in which various changes and modifications are added based on the knowledge of those skilled in the art.

For example, the autonomous vehicle M may have a spare battery other than the limp home battery 2. In addition, the limp-home usable sensors 3 only need to include at least one of the front camera F1 and the front radar RE The autonomous vehicle M does not have to include the left side camera F2, the right side camera F3, and the rear camera F4.

The limp-home usable sensors 3 do not necessarily include all of lidars L1 to L4; some of these lidars may not be included depending on the direction. Furthermore, instead of lidars L1 to L4, the autonomous vehicle M may have an omnidirectional lidar mounted on the roof of the autonomous vehicle M (for example, in the center of the roof). In this case, the imp-home sensors 3 may include the omnidirectional lidar. Note that the autonomous vehicle M does not necessarily have to include lidars. The limp-home usable sensors 3 may be configured not to include any lidar.

When a limp home control ECU for the limp home control is provided separately from the autonomous driving ECU 10, the limp home battery 2 does not need to be connected to the autonomous driving ECU 10. In this case, the limp home battery 2 only need to be connected to the limp home control ECU. From the standpoint of vehicle stability, the limp home battery 2 may be connected to the sideslip prevention unit 51. Furthermore, the HMI 60 does not necessarily have to include the vehicle-external notification unit 62.

What is claimed is:

1. An autonomous vehicle that can perform limp home control for causing a vehicle to autonomously take refuge, the autonomous vehicle comprising:
    an ECU configured to perform the limp home control;
    limp-home usable sensors configured to detect an external environment of the autonomous vehicle, the limp-home usable sensors being sensors used for the limp home control and being connected to the ECU;
    limp-home unusable sensors configured to detect the external environment of the autonomous vehicle, the limp-home unusable sensors being sensors not used for the limp home control; and
    a limp home battery connected to the ECU and the limp-home usable sensors but not connected to the limp-home unusable sensors, wherein:
    the limp-home usable sensors include a front radar configured to detect the external environment in front of the autonomous vehicle; and
    the limp-home unusable sensors include a rear radar configured to detect the external environment behind the autonomous vehicle.

2. The autonomous vehicle according to claim 1, wherein:
    the limp-home usable sensors further include a front camera configured to detect the external environment in front of the autonomous vehicle; and
    the limp-home unusable sensors further include a rear camera configured to detect the external environment behind the autonomous vehicle.

3. The autonomous vehicle according to claim 1, wherein the limp-home unusable sensors further include sonar sensors.

4. The autonomous vehicle according to claim 1, wherein the limp home battery is connected to a vehicle external notification unit configured to notify an outside of the autonomous vehicle of a state of the autonomous vehicle.

5. The autonomous vehicle according to claim 1, further comprising:
    a main battery connected to and configured to power the limp-home usable sensors, the limp-home unusable sensors, and the ECU, wherein
    in response to a failure of the main battery,
        the limp home battery is configured to power the ECU and the limp-home usable sensors, and not power the limp-home unusable sensors, and
        the ECU, powered by the limp home battery, is configured to perform the limp home control.

* * * * *